(12) United States Patent  (10) Patent No.: US 8,082,728 B2
Murrow et al.  (45) Date of Patent: *Dec. 27, 2011

(54) SYSTEM AND METHOD OF CONTINUOUS DETONATION IN A GAS TURBINE ENGINE

(75) Inventors: Kurt David Murrow, Liberty Township, OH (US); Lawrence nmn Butler, Eydon (GB)

(73) Assignee: General Electric Company, Schenectady, NY (US)

( * ) Notice: Subject to any disclaimer, the term of this patent is extended or adjusted under 35 U.S.C. 154(b) by 986 days.

This patent is subject to a terminal disclaimer.

(21) Appl. No.: 12/024,592

(22) Filed: Feb. 1, 2008

(65) Prior Publication Data

US 2009/0193786 A1    Aug. 6, 2009

(51) Int. Cl.
*F02K 5/02*    (2006.01)
*F02K 7/00*    (2006.01)
(52) U.S. Cl. .................................. 60/247; 60/39.38
(58) Field of Classification Search ............ 60/247, 60/39.38, 39.39, 39.78
See application file for complete search history.

(56) References Cited

U.S. PATENT DOCUMENTS

| | | | | |
|---|---|---|---|---|
| 756,210 A * | 4/1904 | Butler | ............ | 415/75 |
| 2,553,548 A * | 5/1951 | Pawl et al. | ............ | 123/241 |
| 3,175,359 A * | 3/1965 | Szlechter | ............ | 60/39.45 |
| 3,386,245 A * | 6/1968 | Gamage | ............ | 376/391 |
| 3,556,670 A * | 1/1971 | Tucker | ............ | 415/75 |
| 3,693,601 A * | 9/1972 | Sauder | ............ | 123/203 |
| 3,938,915 A * | 2/1976 | Olofsson | ............ | 418/9 |
| 3,947,163 A * | 3/1976 | Olofsson | ............ | 418/203 |
| 4,222,231 A * | 9/1980 | Linn | ............ | 60/39.45 |
| 4,482,305 A * | 11/1984 | Natkai et al. | ............ | 418/48 |
| 4,603,549 A * | 8/1986 | Albrecht | ............ | 60/791 |
| 4,912,924 A * | 4/1990 | Stockwell | ............ | 60/39.45 |
| 5,345,758 A | 9/1994 | Bussing | | |
| 5,901,550 A | 5/1999 | Bussing et al. | | |
| 6,505,462 B2 | 1/2003 | Meholic | | |
| 6,845,620 B2 * | 1/2005 | Nalim | ............ | 60/776 |
| 6,889,505 B2 | 5/2005 | Butler et al. | | |
| 6,928,804 B2 | 8/2005 | Venkataramani et al. | | |
| 6,931,858 B2 | 8/2005 | Venkataramani et al. | | |
| 7,530,217 B2 * | 5/2009 | Murrow et al. | ............ | 60/39.45 |
| 7,621,118 B2 * | 11/2009 | Snyder et al. | ............ | 60/247 |
| 7,624,565 B2 * | 12/2009 | Murrow et al. | ............ | 60/39.45 |
| 7,707,815 B2 * | 5/2010 | Murrow et al. | ............ | 60/39.45 |
| 7,854,111 B2 * | 12/2010 | Murrow et al. | ............ | 60/39.45 |
| 7,905,084 B2 * | 3/2011 | Murrow et al. | ............ | 60/247 |

(Continued)

*Primary Examiner* — William Rodriguez
(74) *Attorney, Agent, or Firm* — General Electric Company; William Scott Andes; David J. Clement (57) ABSTRACT

A continuous detonation system, including: a rotatable member including a forward end, an aft end, a circumferential wall and a longitudinal centerline axis extending therethrough; an outer circumferential wall, wherein the rotatable member is positioned therein so that the circumferential wall of the rotatable member is spaced radially inwardly from the outer circumferential wall; at least one helical channel formed by a plurality of helical sidewalls extending between the circumferential wall of the rotatable member and the outer circumferential wall, each helical channel being open at the forward end and the aft end of the rotatable member so as to provide flow communication therethrough; an air supply for providing air to each helical channel; and, a fuel supply for providing fuel to each helical channel. In this way, a mixture of the fuel and air is continuously detonated within each helical channel in a manner such that combustion gases exit therefrom with an increased pressure and temperature.

19 Claims, 10 Drawing Sheets

U.S. PATENT DOCUMENTS

| | | | |
|---|---|---|---|
| 2004/0208740 A1* | 10/2004 | Hubbard | 415/72 |
| 2009/0196733 A1* | 8/2009 | Murrow et al. | 415/73 |
| 2009/0322102 A1* | 12/2009 | Lu et al. | 290/40 R |
| 2010/0242435 A1* | 9/2010 | Guinan et al. | 60/247 |

* cited by examiner

SYSTEM AND METHOD OF CONTINUOUS DETONATION IN A GAS TURBINE ENGINE

CROSS-REFERENCE TO RELATED APPLICATION

The present application is related to an application entitled "Rotary Pressure Rise Combustor For A Gas Turbine Engine," having Ser. No. 12/024,528, now U.S. Pat. No. 7,905,084, which is filed concurrently herewith and is owned by the assignee of the present invention.

BACKGROUND OF THE INVENTION

The present invention relates generally to a system and method of continuous detonation in a gas turbine engine and, in particular, to a system and method of continuous detonation in a gas turbine engine where a mixture of fuel and air is continuously detonated in at least one helical channel of a rotatable member to form combustion gases having an increased pressure and temperature.

It is well known that typical gas turbine engines are based on the Brayton Cycle, where air is compressed adiabatically, heat is added at constant pressure, the resulting hot gas is expanded in a turbine, and heat is rejected at constant pressure. The energy above that required to drive the compression system is then available for propulsion or other work. Such gas turbine engines generally rely upon deflagrative combustion to burn a fuel/air mixture and produce combustion gas products which travel at relatively slow rates and constant pressure within a combustion chamber. While engines based on the Brayton Cycle have reached a high level of thermodynamic efficiency by steady improvements in component efficiencies and increases in pressure ratio and peak temperature, further improvements are becoming increasingly costly to obtain.

Accordingly, improvements in engine efficiency have been sought by modifying the engine architecture such that the combustion occurs as a detonation in either a continuous or pulsed mode. Most pulse detonation devices employ detonation tubes that are fed with a fuel/air mixture that is subsequently ignited. A combustion pressure wave is then produced, which transitions into a detonation wave (i.e., a fast moving shock wave closely coupled to the reaction zone). The products of combustion follow the detonation wave at the speed of sound relative to the detonation wave and at significantly elevated pressure. Such combustion products then exit through a nozzle to produce thrust. Examples of a pulse detonation engine are disclosed in U.S. Pat. No. 5,345,758 to Bussing and U.S. Pat. No. 5,901,550 to Bussing et al. Simple pulse detonation engines have no moving parts with the exception of various forms of externally actuated valves. Such valves are used to control the duration of the fuel/air introduction and to prevent backflow of combustion products during the detonation process. An example of a rotary valve utilized for pulse detonation engines is disclosed in U.S. Pat. No. 6,505,462 to Meholic. While such pulse detonation configurations have advanced the state of the art, the valves and associated actuators are subjected to very high temperatures and pressures. This not only presents a reliability problem, but can also have a detrimental effect on the turbomachinery of the engine.

Several pulse detonation designs which have eliminated the need for a separate valve, and are also owned by the assignee of the present invention, have been disclosed in U.S. Pat. No. 6,928,804 to Venkataramani et al., U.S. Pat. No. 6,889,505 to Butler, et al., U.S. Pat. No. 6,904,750 to Venkataramani et al., and U.S. Pat. No. 6,931,858 to Venkataramani et al. While each of the aforementioned pulse detonation systems are useful for their intended purpose, the task of creating and controlling a periodic detonation must be addressed, as well as integration of the device into an otherwise steady flow propulsion system. Other obstacles include the prevention of backflow into the lower pressure regions upstream of the pulse detonator, survivability of turbomachinery and ductwork upstream and downstream of the pulse detonator in an axially unsteady flow field, and capability of cooling flows for maintaining a positive gradient during pulses.

Accordingly, it would be desirable for a mechanism to be developed which sustains continuous detonation of a fuel-air mixture within a compact device. In this way, the continuous detonation process serves to significantly elevate the temperature and pressure of the incoming mixture. At the same time, a steady surrounding flow field is promoted, gases upstream and downstream of the device are isolated, and a high enthalpy exit flow ready to do work is produced. It would also be desirable for a continuous detonation system to be developed for a gas turbine engine which is able to operate the engine without the need for a separate valve and without causing adverse effects on the other components of the gas turbine engine. Further, it would be desirable for such continuous detonation system to be adaptable to a gas turbine engine for both aeronautical and industrial applications so as to provide a substitute for a combustor or possibly eliminate the entire core (i.e., a high pressure compressor, combustor, and high pressure turbine).

BRIEF SUMMARY OF THE INVENTION

In accordance with a first exemplary embodiment of the invention, a continuous detonation system is disclosed as including: a rotatable member including a forward end, an aft end, a circumferential wall and a longitudinal centerline axis extending therethrough; an outer circumferential wall, wherein the rotatable member is positioned therein so that the circumferential wall of the rotatable member is spaced radially inwardly from the outer circumferential wall; at least one helical channel formed by a plurality of helical sidewalls extending between the circumferential wall of the rotatable member and the outer circumferential wall, each helical channel being open at the forward end and the aft end of the rotatable member so as to provide flow communication therethrough; an air supply for providing air to each helical channel; and, a fuel supply for providing fuel to each helical channel. In this way, a mixture of the fuel and air is continuously detonated within each helical channel in a manner such that combustion gases exit therefrom with an increased pressure and temperature.

In a second exemplary embodiment of the invention, a method of providing continuous detonation in a device is disclosed as including the following steps: providing at least one helical channel between a rotatable member and an outer circumferential wall spaced radially outwardly from the rotatable member, each helical channel being disposed therethrough at a predetermined pitch angle to a longitudinal centerline axis extending through the rotatable member; providing air to each helical channel; providing fuel to each helical channel; initiating a detonation wave from a mixture of the air and fuel in each helical channel; and, producing combustion gases which exit from the helical channel with an increased pressure and temperature.

In accordance with a third embodiment of the invention, a gas turbine engine is disclosed as including a fan section at a forward end of the gas turbine engine having at least a first fan blade row connected to a drive shaft and a continuous detonation system for powering the drive shaft. The continuous detonation system further includes: a rotatable member including a forward end, an aft end, a circumferential wall and a longitudinal centerline axis extending therethrough; an outer circumferential wall, wherein the rotatable member is positioned therein so that the circumferential wall of the rotatable member is spaced radially inwardly from the outer circumferential wall; at least one helical channel formed by a plurality of helical sidewalls extending between the circumferential wall of the rotatable member and the outer circumferential wall, each helical channel being open at the forward end and the aft end of the rotatable member so as to provide flow communication therethrough; an air supply for providing air to each helical channel; and, a fuel supply for providing fuel to each said helical channel. In this way, a mixture of the fuel and air is continuously detonated within each helical channel in a manner such that combustion gases exit therefrom with an increased pressure and temperature. The gas turbine engine further includes a hub member coupled to the rotatable member and the drive shaft. A turbine may also be positioned downstream of the rotatable member and coupled to the drive shaft to extract power from detonation products exiting the rotatable member. In addition, the gas turbine engine preferably includes a device for causing the rotatable member to have a predetermined rotational speed for starting, a device accessible to each helical channel for initiating the detonation of the fuel/air mixture therein, and/or a device for mixing the air and fuel prior to entering each helical channel.

DETAILED DESCRIPTION OF THE INVENTION

Figure 1:
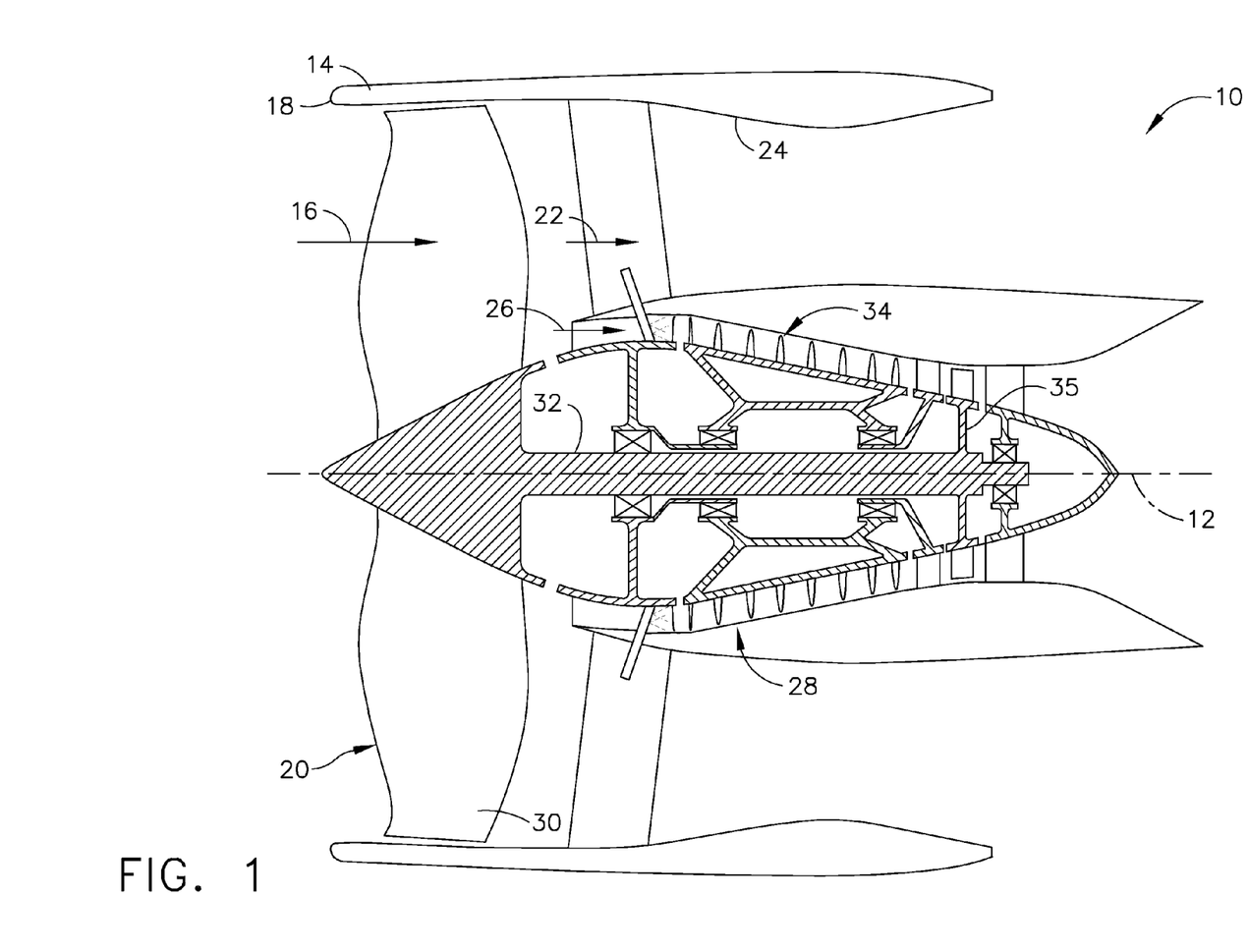
FIG. 1 is a longitudinal schematic sectional view of a first gas turbine engine configuration including a continuous detonation system in accordance with the present invention.
Figure 2:
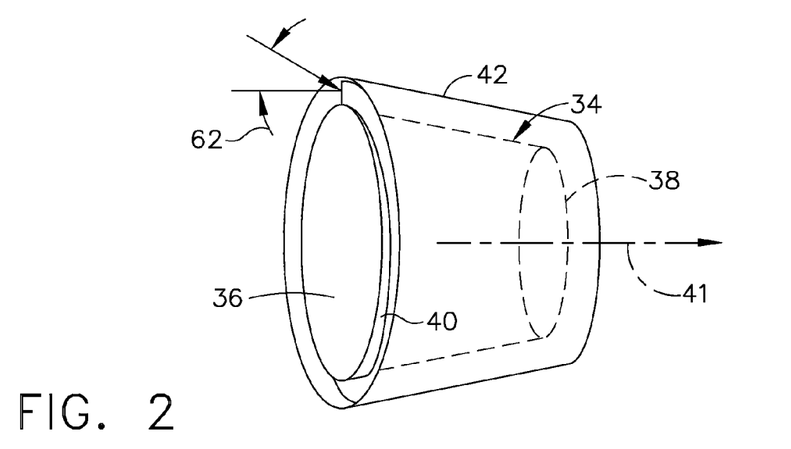
FIG. 2 is a schematic perspective view of the continuous detonation system depicted in FIG. 1.

Referring now to the drawings in detail, wherein identical numerals indicate the same elements throughout the figures, FIG. 1 schematically depicts an exemplary gas turbine engine 10 (high bypass type) utilized with aircraft having a longitudinal or axial centerline axis 12 therethrough for reference purposes. Gas turbine engine 10 includes a nacelle 14 to assist in directing a flow of air (represented by arrow 16) through an inlet 18 to a fan section 20 as is well known. Air flow 16 is then split downstream of fan section 20 so that a first portion (represented by arrow 22) flows through an outer duct 24 and a second portion (represented by arrow 26) is provided to a continuous detonation system 28. A first fan blade row 30 is also preferably connected to a drive shaft 32 which is preferably powered by means of a turbine 35 which receives high pressure combustion gases produced by continuous detonation system 28.

Figure 3:
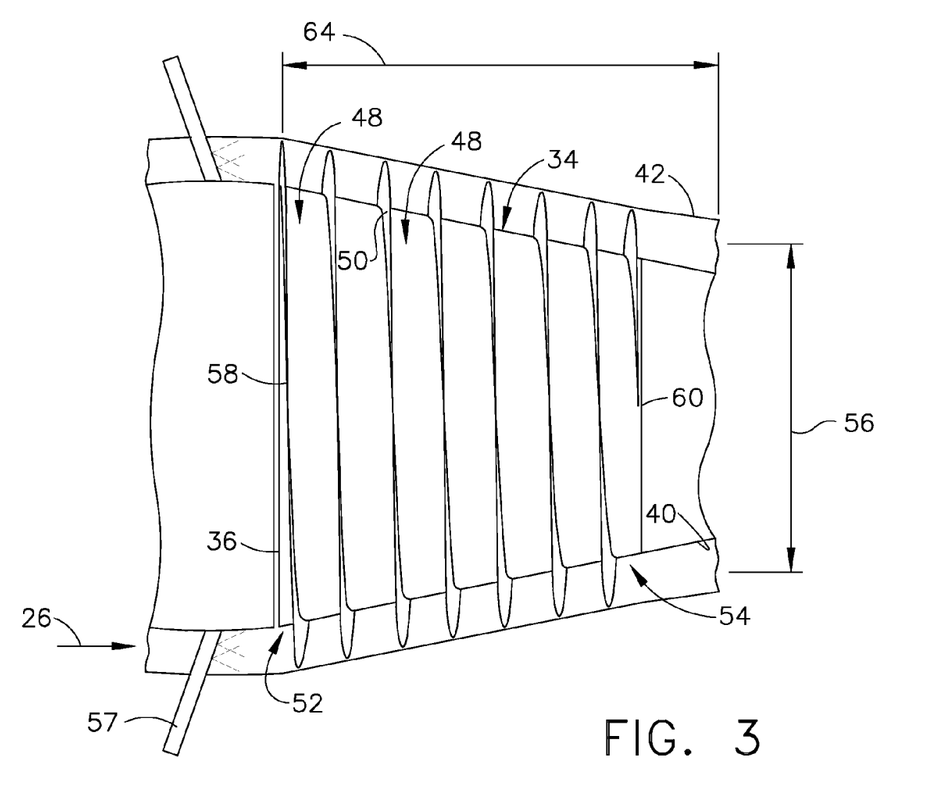
FIG. 3 is an enlarged, partial longitudinal schematic sectional view of the gas turbine engine depicted in FIG. 1, wherein a portion of the continuous detonation system is shown in greater detail.

More specifically, continuous detonation system 28 includes a rotatable member 34 having a forward end 36, an aft end 38, a circumferential wall 40 and a longitudinal centerline axis 41 extending therethrough. An outer circumferential wall 42, which is preferably stationary but may also be rotatable, is preferably configured so that rotatable member 34 is positioned therein so that circumferential wall 40 of rotatable member 34 is spaced radially inwardly from outer circumferential wall 42. Rotatable member 34 and outer circumferential wall 42 preferably have a frusto-conical shape, whereby circumferential walls 40 and 42 are substantially parallel from forward end 36 to aft end 38. It will be appreciated, however, that circumferential walls 40 and 42 need not be substantially parallel. As seen in FIG. 3, at least one helical channel (or passage) 48 is formed by a plurality of helical sidewalls 50 having a thickness 66 which extends between circumferential walls 40 and 42 and is preferably connected to circumferential wall 40. It will be appreciated that each helical channel 48 is open at forward and aft ends 36 and 38 of rotatable member 34 so as to provide flow communication therethrough. Preferably a plurality of intertwined helical channels 48 are provided between circumferential walls 40 and 42 in order to provide a reasonable channel aspect ratio (i.e., height-to-width ratio). Each helical channel 48 includes a first opening 52 located adjacent forward end 36 of rotatable member 34 and a second opening 54 located adjacent aft end 38 of rotatable member 34.

Figure 4:
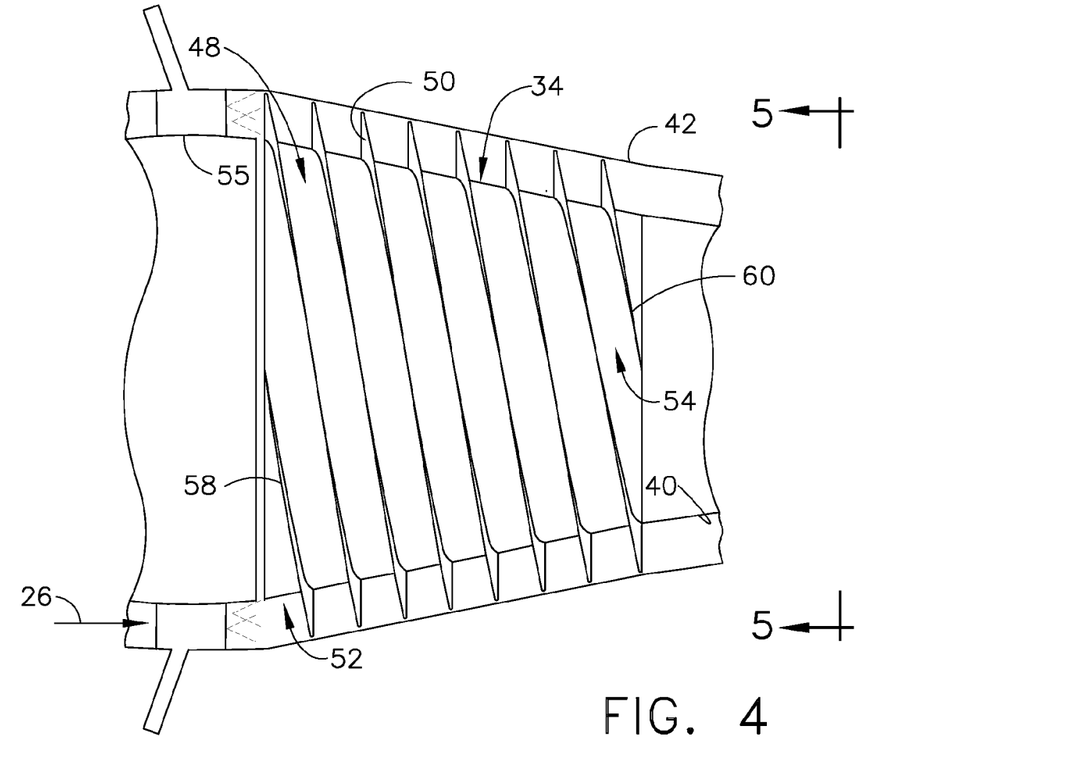
FIG. 4 is an enlarged, partial longitudinal schematic sectional view of the gas turbine engine depicted in FIG. 1, wherein a portion of a continuous detonation system having an alternative design is shown in greater detail.
Figure 5:
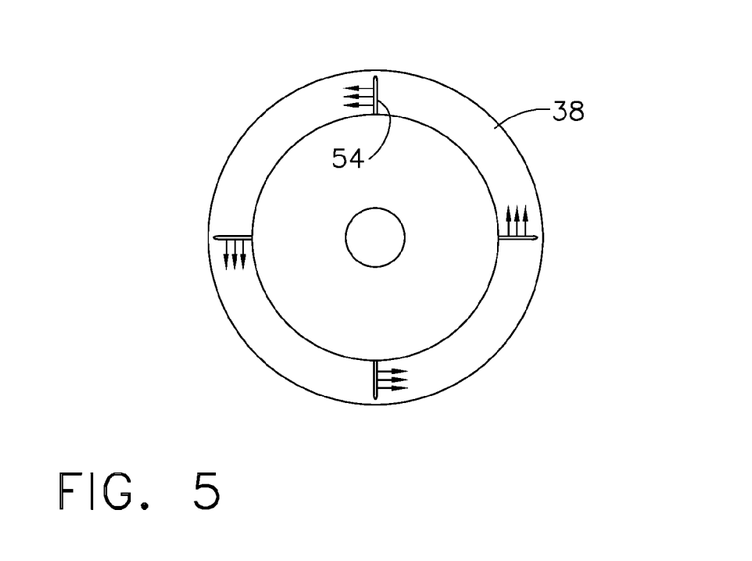
FIG. 5 is an aft view of the continuous detonation system depicted in FIG. 3.

Air 26 is provided to each helical channel 48 in rotatable member 34 and a fuel supply (not shown) provides fuel via injectors 57 to each such helical channel 48. The air and fuel may be mixed prior to (via a pre-mixer 55 shown in FIG. 4) or after entering helical channel 48. In the latter case, fuel injectors 57 provide fuel axially to first opening 52 of helical channel 48 (see FIGS. 3 and 11) or radially to helical channel 48 at a predetermined location along longitudinal centerline axis 12 (not shown). In this way, it will be appreciated that a mixture of fuel and air is preferably provided to and continuously detonated in each helical channel 48 in a manner such that combustion gases exit therefrom with an increased pressure and temperature. While not integral to the present invention, it is also preferred that the combustion gases will interact with each helical channel 48 during and after combustion to create a torque offsetting the torque created by the shock wave and sustaining the rotation of rotatable member 34.

Given the preferred frusto-conical shape of rotatable member 34, diameter 56 (and its corresponding cross-sectional area) of each helical channel 48 preferably progressively decreases from a first end 58 located adjacent to forward end 36 of rotatable member 34 to a second end 60 located adjacent to aft end 38 of rotatable member 34. It will also be understood that helical channel 48 will have a predetermined pitch angle 62 in the circumferential plane with respect to longitudinal centerline axis 12, where pitch angle 62 is preferably a function of a diameter for rotatable member 34, the rotational speed of rotatable member 34, and a speed of air entering helical channel 48. Pitch angle 62 of helical channel 48 preferably varies from forward end 36 to aft end 38 of rotatable member 34 within a range of approximately 50-82°, although it may be maintained substantially constant if desired. It will further be noted that each helical channel 48 preferably has a predetermined number of turns from forward end 58 to aft end 60 which is dependent upon the channel length required for combustion. This, in turn, determines axial length 64 for rotatable member 34. In order to facilitate fluid flow into and out of helical channel 48, pitch angle 62 is preferably designed so that incoming fluid is accepted cleanly into first opening 52 at design speed using a fluid velocity triangle approach and metal angle offset. Similarly, second opening 54 of helical channel 48 is preferably configured such that outgoing fluid resumes a substantially axial orientation in the absolute frame of reference.

Figure 6:
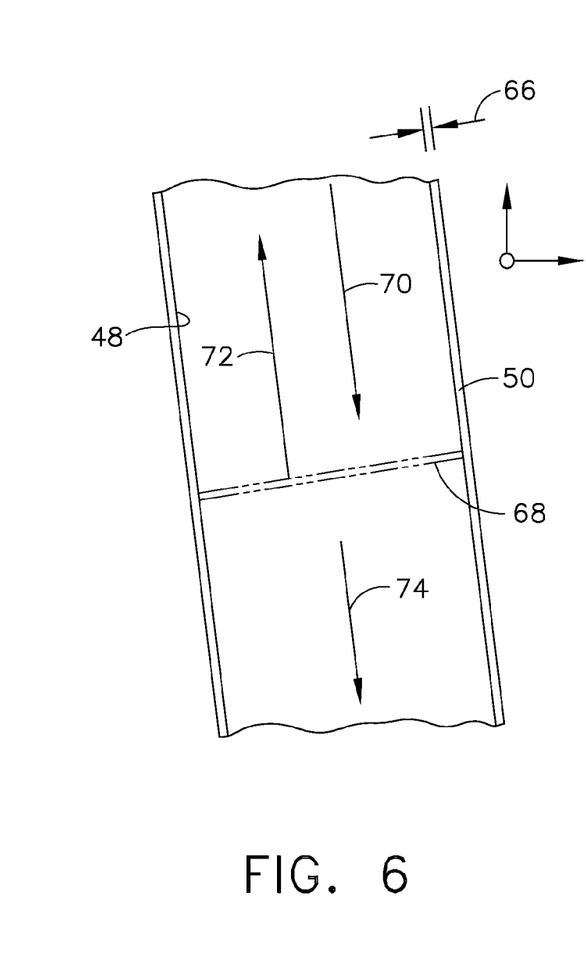
FIG. 6 is a partial diagrammatic view of a helical channel in the continuous detonation system depicted in FIGS. 1-3, where a detonation wave is depicted therein.

As depicted in FIG. 6, each helical channel 48 preferably has a substantially rectangular cross-section, where the cross-sectional area thereof preferably decreases from first helical channel end 58 to second helical channel end 60. Alternatively, each helical channel 48 may have a substantially curvilinear cross-section, where the cross-sectional area thereof preferably decreases from first helical channel end 58 to second helical channel end 60.

A detonation wave 68 is depicted in FIG. 6, where such detonation wave 68 is preferably substantially stationary or standing in a predetermined area of helical channel 48 (within the relative frame thereof). It will be understood that an arrow 70 represents an incoming fuel-air mixture having a designated speed to helical channel 48, an arrow 72 represents a velocity of detonation wave 68 which travels in an opposite direction of fuel-air mixture 70, and an arrow 74 represents products of combustion which continue to travel through helical channel 48 past detonation wave 68. It will be appreciated that detonation wave 68 is located within helical channel 48 at a position where a speed of air in helical channel 48 is equivalent to a velocity of detonation wave 68 for a given rotational speed of rotatable member 34. The position of detonation wave 68 within helical channel 48 may fluctuate as relative changes in air speed and detonation wave velocity occur, but the area convergence of the passage (as a function of depth) into helical channel 48 will tend to stabilize the position of detonation wave 68 in rotatable member 34.

Further, it will be understood that as the fuel-air mixture 70 passes through the normal shock of detonation wave 68, this results in a loss in the dynamic head of fuel-air mixture 70 and reduces its speed to a subsonic level (e.g., less than mach 0.5) in the frame of reference of rotatable member 34. As a consequence of this loss in speed by fuel-air mixture 70 and the adiabatic nature of the shock, the static temperature of fuel-air mixture 70 is elevated substantially and ignited. Thereafter, heat addition occurs in helical channel 48 as a deflagrative combustion takes place. After this heat addition, the flow of combustion products 74 is accelerated through a converging aft portion of helical channel 48 to a sonic condition at aft end 38 of rotatable member 34.

Unlike pulse detonation, continuous detonation system 28 incorporates margin against backflow by creating a relative flow field at forward end 36 of rotatable member 34 that moves slightly faster than detonation wave 68. Accordingly, high pressure ratio detonations become feasible in a valveless configuration while maintaining isolation of flow properties upstream and downstream. The continuous nature of the detonation also means that any turbomachinery surrounding continuous detonation system 28 (e.g., fan section 20) will not be subjected to an unsteady flow field.

During transient operation of gas turbine engine 10, if fuel flow into rotatable member 34 is increased while the rotor speed thereof remains constant, detonation wave 68 will translate axially forward to a new equilibrium point where the relative speed of fuel-air mixture 70 and detonation wave speed 72 balance. If the rotor speed of rotatable member 34 is a controlled quantity, the control system (not shown) must increase the rotor speed to ensure that detonation wave 68 remains within the predetermined acceptable range of positions in helical channel 48. Similarly, as fuel flow is reduced at constant rotor speed of rotatable member 34, detonation wave 68 will translate axially aftward in helical channel 48 and the control system must reduce rotor speed of rotatable member 34 to reposition detonation wave 68. It is preferred, however, that the shaft power requirement of continuous detonation system 28 be designed so that the rotor speed of rotatable member 34 holds detonation wave 68 within an acceptable range of positions throughout the range of steady state operation, thus eliminating the need to control rotor speed of rotatable member 34 and fuel flow independently.

Figure 7:
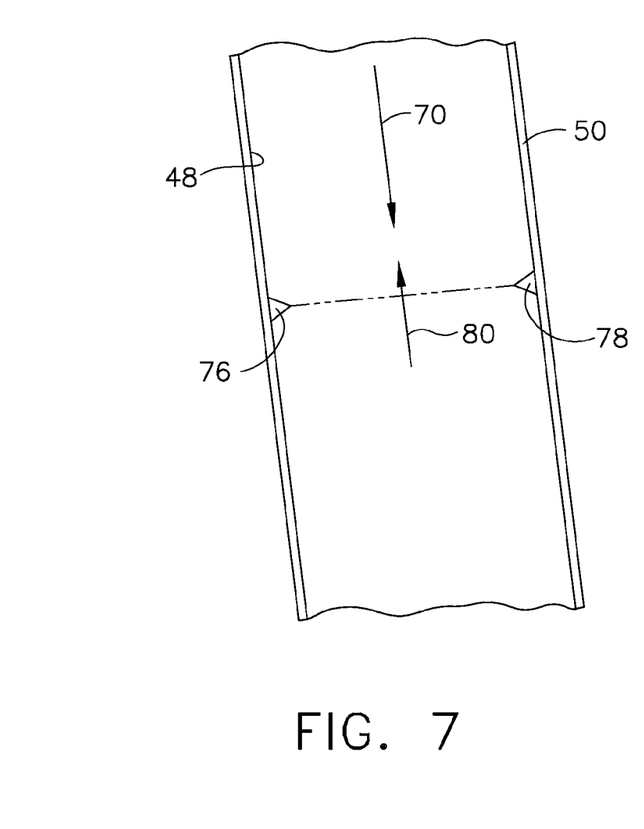
FIGS. 7-9 are partial diagrammatic views of a helical channel, where the process for initiating a detonation wave is represented therein.
Figure 8:
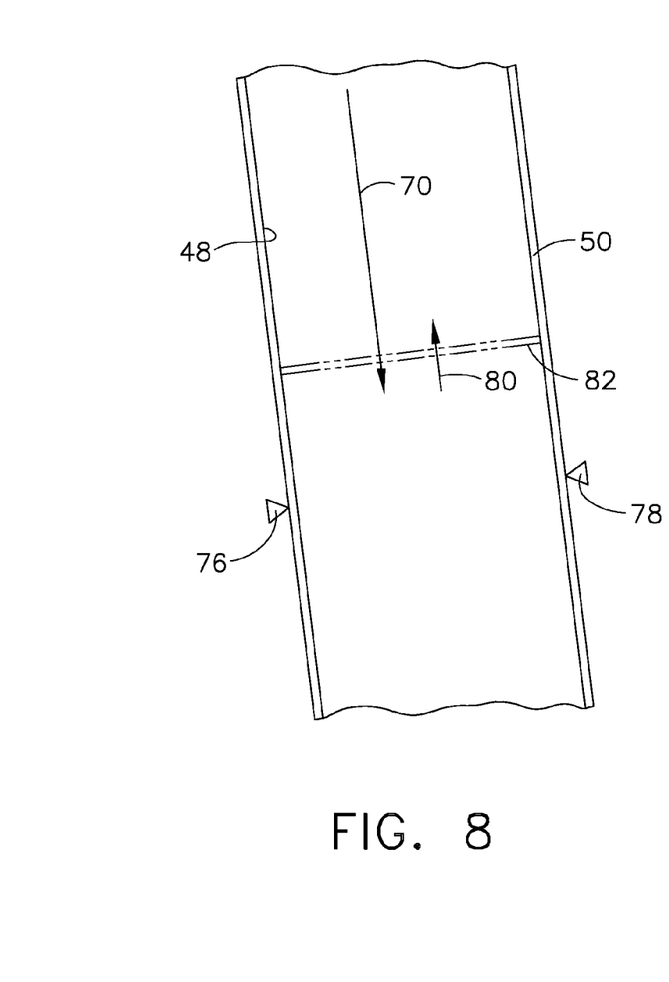
Figure 9:
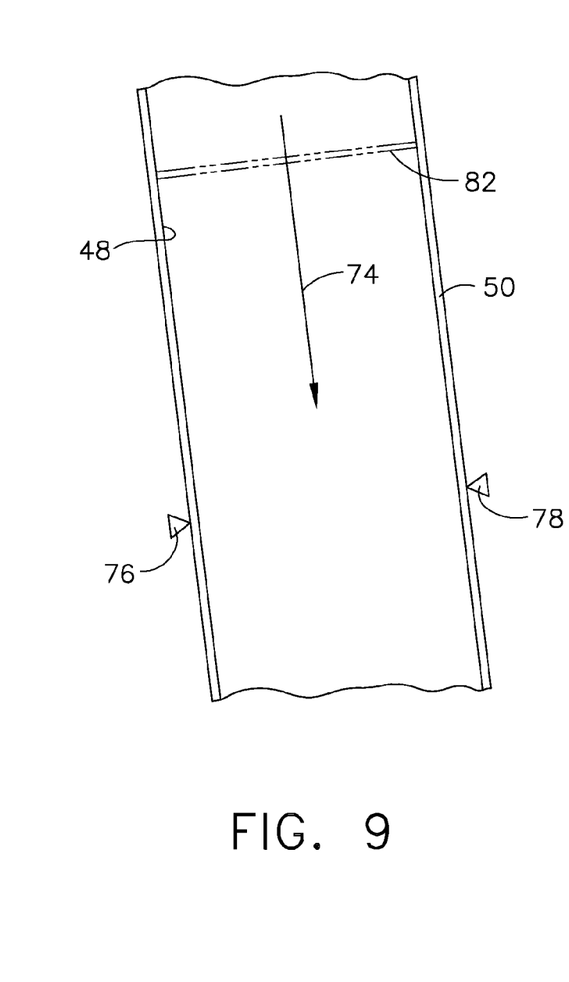

One manner of initiating detonation wave 68 is by means of a shock induction as shown in FIGS. 7-9. In particular, flow obstructions 76 and 78 are temporarily introduced into each helical channel 48 from helical sidewalls 50 near aft end 38 of rotatable member 34. It will be understood that air flow at this location has been diffused and is moving at a lower speed than detonation wave velocity 72. Introduction of flow obstructions 76 and 78 preferably induce a shock wave 80, thereby raising the static temperature of gaseous fuel-air mixture 70 and auto-igniting it. As combustion occurs downstream of shock wave 80, a detonation wave 82 will accelerate forward from flow obstructions 76 and 78 and come to rest as detonation wave 82 at the point where relative air speed and detonation wave speeds balance.

Figure 11:
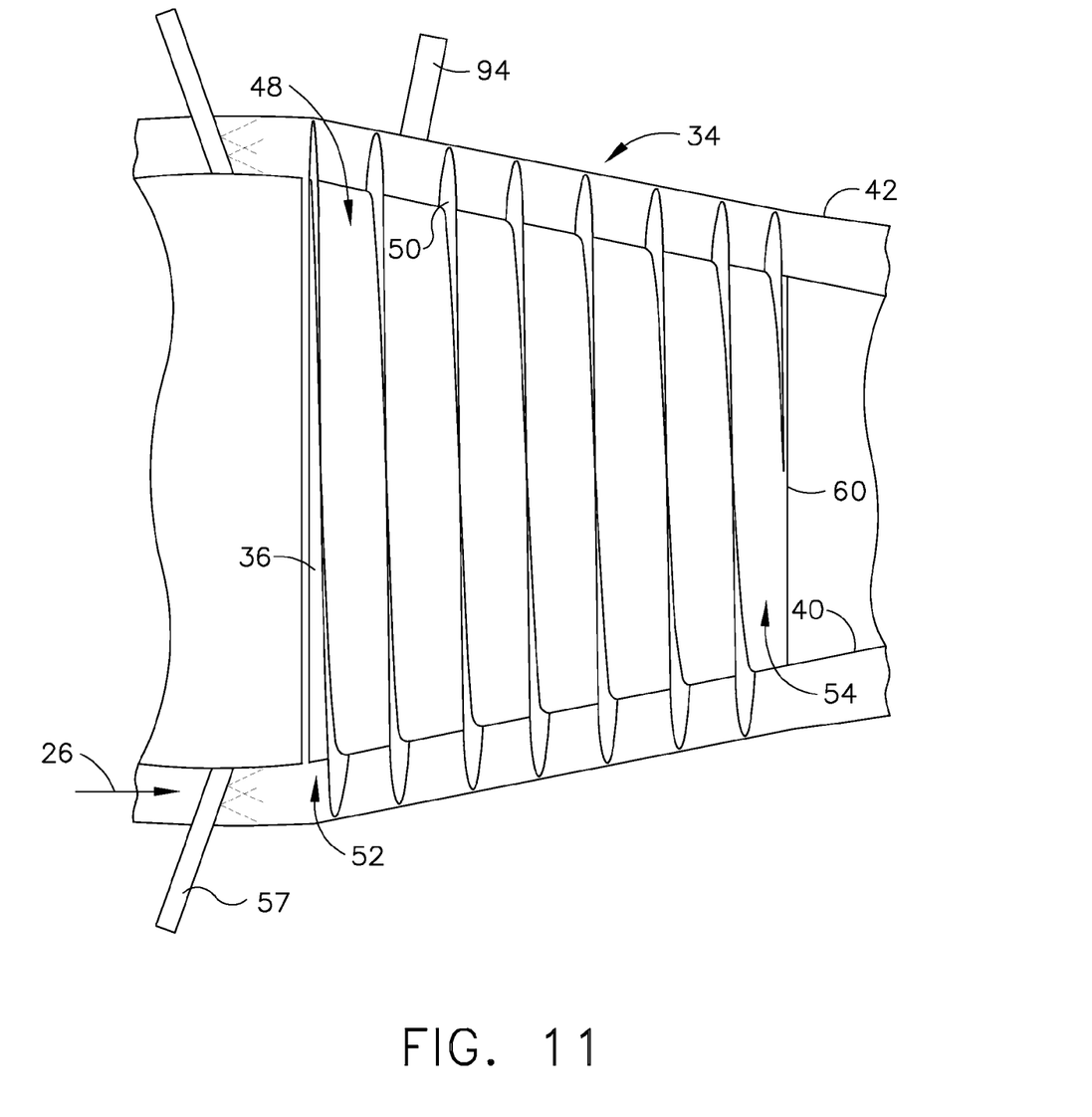
FIG. 11 is an enlarged, partial longitudinal schematic sectional view of an alternative configuration for the continuous detonation system depicted in FIG. 2.

An alternative or possible means of igniting fuel-air mixture 70 within helical channel 48 is an igniter 94 (see FIG. 11). It will be appreciated that igniter 94 is preferably positioned so as to add heat downstream of the induced shock structure.

Figure 10:
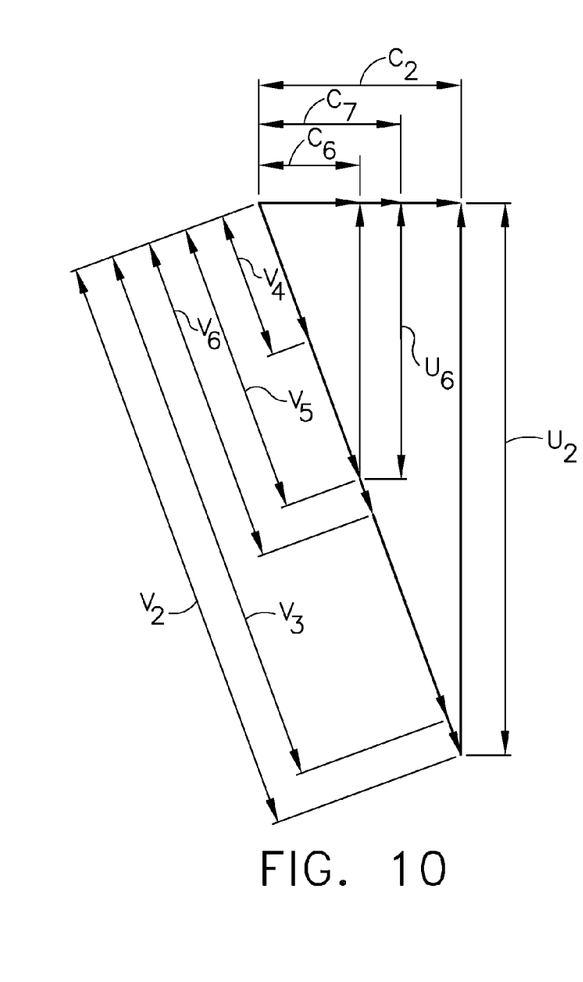
FIG. 10 is a velocity diagram illustrating a continuous detonation process, where the geometry substantially nullifies the power requirement on the rotor.

FIG. 10 depicts a vector diagram which assists in understanding the processes which the working fluid undergoes from forward end 36 to aft end 38 of rotatable member 34. In particular, it will be seen that the velocity (relative to rotatable member 34) of fuel-air mixture 70 at forward end 36 is obtained by geometrically subtracting the pitchline wheel speed of rotatable member 34 from the absolute velocity thereof (relative to the static support structure of engine 10). The wheel speed is a function of the rotational speed and mean pitchline radius according to $$u_2 = \frac{2 \cdot \pi \cdot r_2 \cdot N}{60 \cdot 12},$$

where $r_2$ is the pitchline radius along rotatable member 34 and N is the rotational speed of rotatable member 34. The relative fluid velocity $v_2$ is then obtained from the equation $v_2 = \sqrt{u_2^2 + c_2^2}$, where $c_2$ is the absolute fluid velocity and is assumed to be axial. In order for the flow to cleanly transition onto rotatable member 34, the required design helix pitch angle $\beta$ is preferably approximately $$\beta = \tan^{-1}\left(\frac{u_2}{c_2}\right)$$

and the aspect ratio, defined as the ratio of the channel height to width, is a function of the annulus area A at forward end 36 of rotatable member 34 and the number n of helical channels 48 therein $$\left(AR = \frac{A \cdot n^2}{(2 \cdot \pi \cdot r_2 \cdot \cos(\beta_2))^2}\right).$$

It will be appreciated that the fluid static properties remain unchanged during the transformation from the absolute to the relative frame, and the total properties incorporate the elevated (supersonic) mach number as denoted by the increase in vector length from $c_2$ to $v_2$ in FIG. 10. As the fluid proceeds into helical channel 48 and to detonation wave front 68, its speed will diminish slightly due to an intentional reduction in the cross-sectional area of helical channel 48 which allows for stabilization of the position for detonation wave 68. This new state is represented in FIG. 10 by velocity vector $v_3$. For detonation wave 68 to remain affixed to helical channel 48, the incoming fluid velocity $v_3$ must be equal in magnitude and opposite in direction to the speed of propagation of detonation wave 68. Because of the immense speeds associated with strong detonation waves, weak detonation designs and/or reactants with low detonation wave propagation speeds are preferred.

Detonation wave 68 is comprised of a shock wave 80 followed by a deflagrative heat addition in the relative frame of reference. Velocity vector $v_4$ represents the velocity immediately behind shock wave 80 prior to heat addition. Vector $v_5$ represents the velocity behind the heat addition and therefore behind detonation wave 68. Behind detonation wave 68, the fluid relative velocity is preferably slightly sonic, and is defined by the throat area at aft end 60 of helical channel 48. This fluid then slightly expands through the remainder of helical channel 48, which preferably is convergent, to a sonic condition at aft end 38 of rotatable member 34 represented by vector $v_6$. Since the flow path radius $r_6$ at aft end 38 is designed to be smaller than at forward end 36, the wheel speed is reduced and given by the following:

$$u_6 = \frac{2 \cdot \pi \cdot r_6 \cdot N}{60 \cdot 12}.$$

Accordingly, the component of the fluid absolute velocity in the axial direction is obtained from the equation $c_{6z} = v_6 \cos(\beta_6)$ and the component in the tangential direction is obtained from previous equation $c_{6u} = v_6 \sin(\beta_6) + u_6$. The shaft work required by rotatable member 34 is represented by the expression $$w_{input} = \frac{u_6 \cdot c_{6u} - u_2 \cdot c_{2u}}{J \cdot g_c},$$

from which it is evident that rotatable member 34 may behave as a turbine and produce shaft work if the product of the inlet wheel speed and the absolute tangential velocity is greater than that of the aft end. In such case, because the inlet product is zero, a negative exit product (i.e., tangential exit velocity opposite the direction of rotation) will cause rotatable member 34 to produce work.

Figure 12:
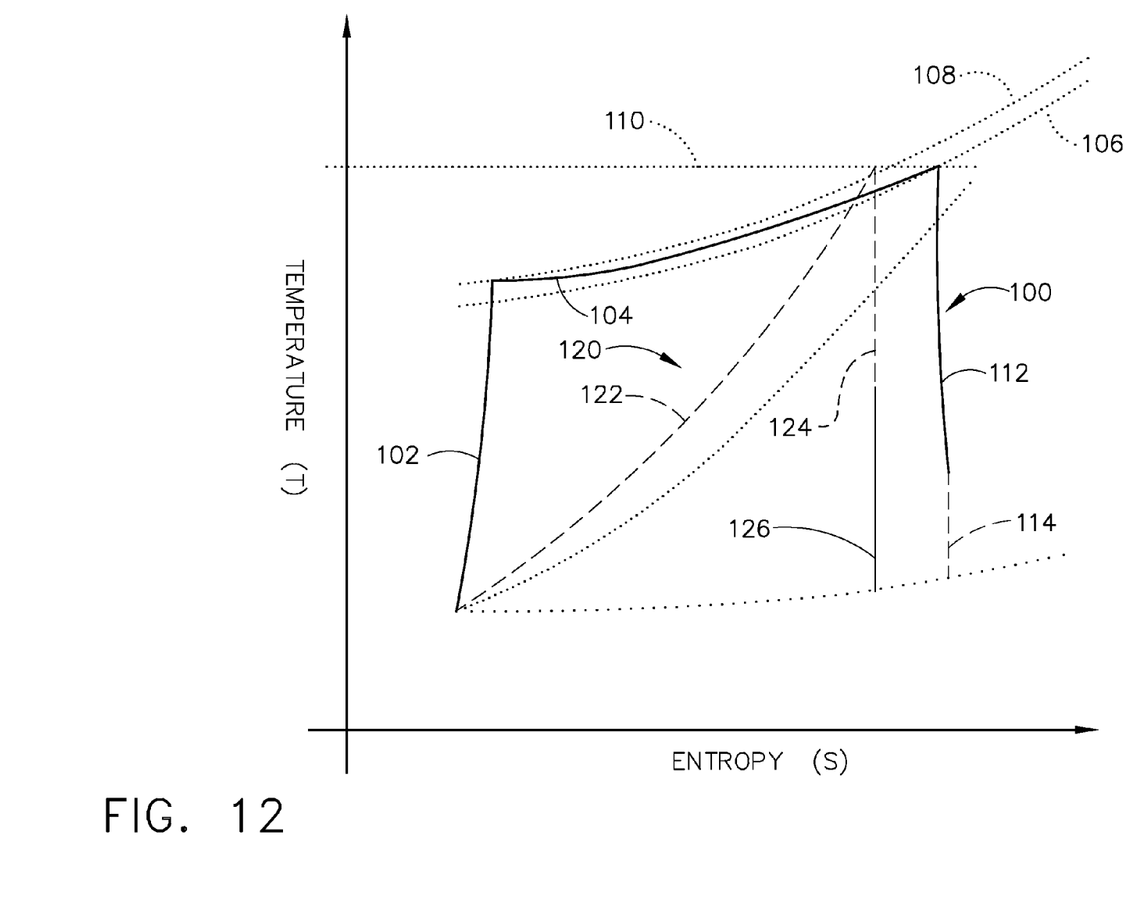
FIG. 12 is a diagram comparing temperature and entropy for a cycle utilizing the continuous detonation system and a Brayton cycle.

In order to demonstrate the thermodynamic advantage of continuous detonation system 28, FIG. 12 depicts a temperature (T) versus entropy (S) diagram comparing the Brayton Cycle with the Continuous Detonation Cycle of the present invention. As seen therein, the Brayton Cycle (bold solid line) is identified generally by reference numeral 100. A first portion 102 thereof involves a temperature (and pressure) rise resulting from a compression of the fluid entering the gas turbine engine. Thereafter, a second portion 104 of the Brayton Cycle is indicative of combustion in the engine and generally conforms to the shape of isobaric curves 106 and 108 until an operating temperature 110 is reached. Finally, a third portion 112 represents a temperature (and pressure) drop resulting from an expansion of the fluid in the turbine. The amount of excess energy is shown by dashed line 114.

Figure 13:
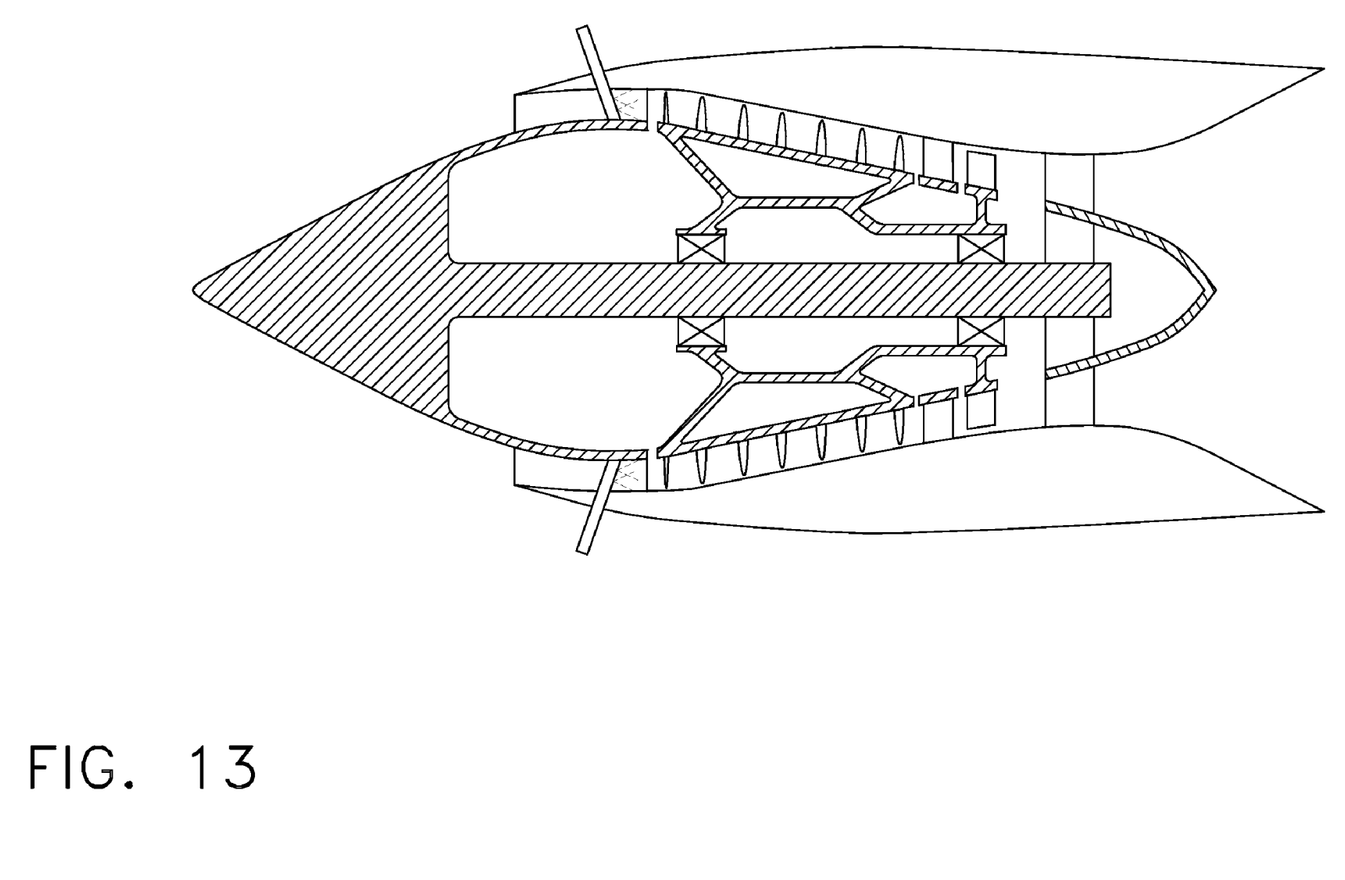
FIG. 13 is a longitudinal schematic sectional view of a second gas turbine engine configuration including a continuous detonation system in accordance with the present invention.

By contrast, the Continuous Detonation Cycle (bold dashed line) is identified generally by reference numeral 120. The detonation portion of the cycle is depicted by dashed line 122 and is comprised of a compressive shock wave followed by an expansive heat addition to operating temperature 110. During this phase of the cycle, a substantial portion of the work required to sustain the shock compression is extracted from the rotor. It will be appreciated, however, that an adiabatic expansion process occurs on rotatable member 34 prior to fluid exhaust. The remaining work for sustaining the shock compression, which is obtained by reducing the mean radius of the chamber and/or increasing the chamber pitch, is represented by dashed line 124. As seen, dashed line 124 begins at the maximum temperature of the detonation cycle and moves vertically downward until it reaches a specified temperature. The gas power remaining in the fluid is represented by solid line 126. This may be higher than that of conventional turbomachinery. Such excess energy can then be expanded through a nozzle for high specific thrust applications (see FIG. 13) or through a turbine to drive a low pressure ratio fan for low specific fuel consumption applications (see FIG. 1).

Figure 14:
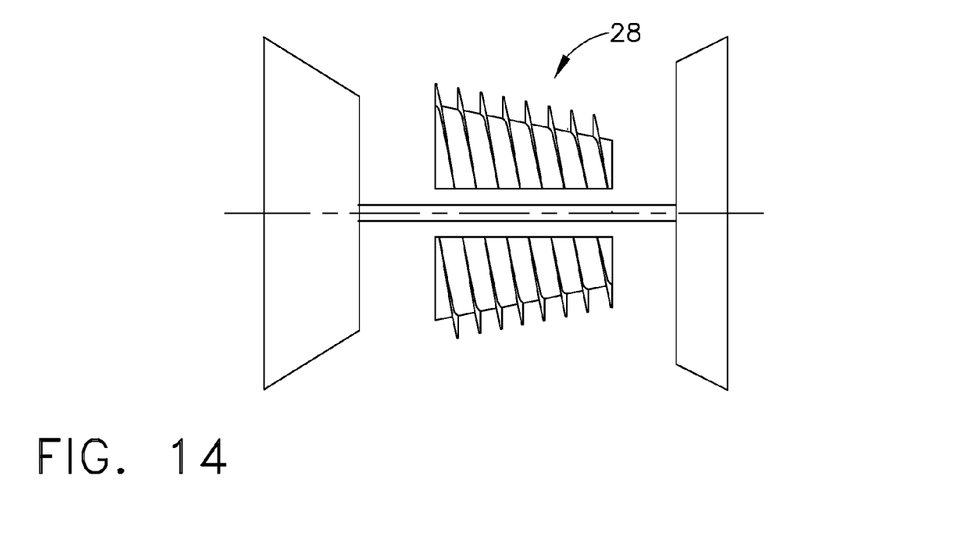
FIG. 14 is a schematic diagram of a gas turbine engine including a continuous detonation system instead of a high pressure core; and, FIG. 15 is a schematic diagram of a gas turbine engine including a continuous detonation system instead of a combustor.
Figure 15:
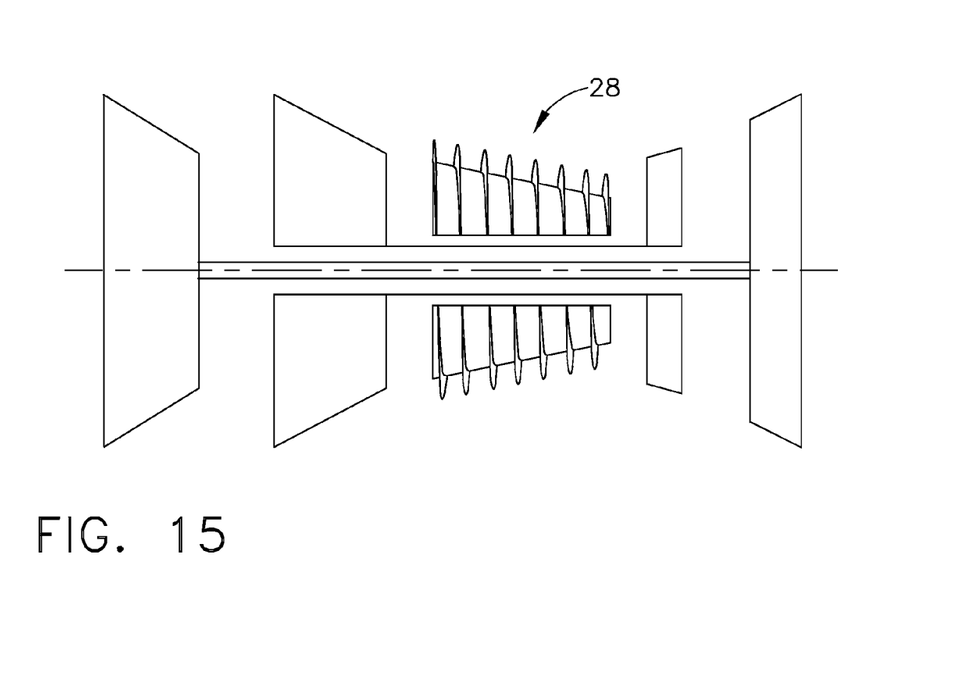

If the net shaft torque produced by continuous detonation system 28 is capable of overcoming the parasitic torque induced by viscous effects, rotatable member 34 is able to sustain operation via its own power extraction without need of shaft power. In such case, if the power imparted to the fluid by continuous detonation system 28 is sufficient, it may be able to replace the entire high pressure core of a gas turbine engine (see FIG. 14). If the net shaft torque is insufficient to maintain rotational speed, continuous detonation system 28 may be utilized instead of a typical combustion device in a gas turbine engine while still requiring assistance to maintain a desired rotational speed. This could be accomplished by means of a device extraneous to gas turbine engine or via a connection to a shaft driven by a turbine of the engine (see FIG. 15).

It will also be appreciated that the present invention also involves a method of providing continuous detonation in a device, which includes the following steps: providing at least one helical channel 48 between rotatable member 34 and outer circumferential wall 42 spaced radially outwardly therefrom, where each helical channel 48 is disposed therethrough at a predetermined pitch angle 62 to longitudinal centerline axis 41 extending through rotatable member 34; providing air to each helical channel 48; providing fuel to each helical channel 48; initiating a detonation wave 68 from a mixture 70 of air and fuel in each helical channel 48; and, producing combustion gases 74 which exit from helical channel 48 with an increased pressure and temperature. Additional steps preferably include: causing rotatable member 34 to rotate at a predetermined speed prior to providing fuel to helical channel 48; controlling a rotational speed of rotatable member 34; and/or controlling a speed of air entering helical channel 48. Mixing of air and fuel may be accomplished either prior to or after entering helical channel 48.

Another preferred step of the method is maintaining detonation wave 68 within a predetermined area of each helical channel 48. Detonation wave 68 is initiated at a predetermined point in helical channel 48 and may be initiated by shock induction of fuel-air mixture 70, an oblique shock caused by a leading edge of helical channel 48, or a separate device 94 having access to helical channel 48.

Having shown and described the preferred embodiment of the present invention, further adaptations of the system and method of continuous detonation described herein can be accomplished by appropriate modifications by one of ordinary skill in the art without departing from the scope of the invention. Moreover, it will be understood that continuous detonation system 28 may be utilized with other types of gas turbine engines not depicted herein.

What is claimed is:

1. A continuous detonation system, comprising:
   (a) a rotatable member including a forward end, an after end, a circumferential wall and a longitudinal centerline axis extending therethrough,
   (b) an outer circumferential wall, wherein said rotatable member is positioned therein so that said circumferential wall of said rotatable member is spaced radially inwardly from said outer circumferential wall;
   (c) at least one helical channel formed by a plurality of helical sidewalls extending between said circumferential wall of said rotatable member and said outer circumferential wall, each said helical channel being open at said forward end and said aft end of said rotatable member so as to provide flow communication therethrough;
   d) an air supply for providing air to each said helical channel; and,
   e) a fuel supply for providing fuel to each said helical channel;
   wherein each said helical channel being arranged and configured such that in operation, a mixture of said fuel and air is continuously detonated within each said helical channel in a manner such that combustion gases exit therefrom with an increased pressure and temperature.

2. The continuous detonation system of claim 1, wherein a detonation wave is maintained substantially within a predetermined area of each said helical channel.

3. The continuous detonation system of claim 1, wherein said combustion gases interact with each said helical channel to create a torque which assists rotation of said rotatable member.

4. The continuous detonation system of claim 2, wherein said predetermined area is adjacent said forward end of said rotatable member.

5. The continuous detonation system of claim 1, wherein a forward end of each said helical channel is oriented at a predetermined pitch angle with respect to said longitudinal centerline axis in a circumferential plane.

6. A continuous detonation system, comprising:
   (a) a rotatable member including a forward end, an after end, a circumferential wall and a longitudinal centerline axis extending therethrough,
   (b) an outer circumferential wall, wherein said rotatable member is positioned therein so that said circumferential wall of said rotatable member is spaced radially inwardly from said outer circumferential wall;
   (c) at least one helical channel formed by a plurality of helical sidewalls extending between said circumferential wall of said rotatable member and said outer circumferential wall, each said helical channel being open at said forward end and said aft end of said rotatable member so as to provide flow communication therethrough;
   d) an air supply for providing air to each said helical channel; and,
   e) a fuel supply for providing fuel to each said helical channel;
   wherein a forward end of each said helical channel is oriented at a predetermined pitch angle with respect to said longitudinal centerline axis in a circumferential plane, and
   wherein said pitch angle of said helical channels is a function of a diameter for said rotatable member, a rotational speed of said rotatable member, and a speed of air entering said helical channel, and
   wherein a mixture of said fuel and air is continuously detonated within each said helical channel in a manner such that combustion gases exit therefrom with an increased pressure and temperature.

7. The continuous detonation system of claim 1, wherein each helical channel has a predetermined number of turns from a forward end to an aft end.

8. The continuous detonation system of claim 1, wherein said rotatable member has a predetermined axial length.

9. The continuous detonation system of claim 1, wherein a cross-sectional area of each said helical channel decreases from said forward end to said aft end of said rotatable member.

10. The continuous detonation system of claim 1, wherein said air and fuel are mixed prior to entering said helical channel.

11. The continuous detonation system of claim 1, wherein said air and fuel are mixed after entering said helical channel.

12. The continuous detonation system of claim 1, further comprising a device for causing said rotatable member to rotate at a predetermined rotational speed prior to and while fuel is supplied thereto.

13. The continuous detonation system of claim 1, further comprising an obstruction located within each said helical channel for creating detonation of said fuel/air mixture therein by shock induction.

14. The continuous detonation system of claim 1, further comprising a device accessible to each said helical channel for initiating said detonation of the fuel/air mixture therein.

15. The continuous detonation system of claim 1, further comprising a device for controlling the speed of air exiting said helical channel.

16. A gas turbine engine, comprising:
   (a) a fan section at a forward end of said gas turbine engine including at least a first fan blade row connected to a drive shaft; and (b) a continuous detonation system for powering said drive shaft, said continuous detonation system further comprising;
  (1) a rotatable member including a forward end, an aft end, a circumferential wall and a longitudinal centerline axis extending therethrough;
  (2) an outer circumferential wall, wherein said rotatable member is positioned therein so that said circumferential wall of said rotatable member is spaced radially inwardly from said outer circumferential wall;
  (3) at least one helical channel formed by a plurality of helical sidewalls extending between said circumferential wall of said rotatable member and said outer circumferential wall, each said helical channel being open at said forward end and said aft end of said rotatable member so as to provide flow communication therethrough;
  (4) an air supply for providing air to each said helical channel; and,
  (5) a fuel supply for providing fuel to each said helical channel;
wherein a mixture of said fuel and air is continuously detonated within each said helical channel in a manner such that combustion gases exit therefrom with an increase pressure and temperature.

17. The gas turbine engine of claim 16, further comprising a hub member coupled to said rotatable member and said drive shaft.

18. The gas turbine engine of claim 16, further comprising a turbine downstream of said rotatable member and coupled to said drive shaft to extract power from detonation products exiting said rotatable member.

19. The gas turbine engine of claim 16, further comprising a device accessible to each said helical channel for initiating said detonation of the fuel/air mixture therein.

* * * * *